United States Patent
Kelif et al.

(10) Patent No.: US 11,304,205 B2
(45) Date of Patent: Apr. 12, 2022

(54) METHOD AND DEVICE FOR CONTROLLING A DATA-TRANSMISSION MODE USED BY A VEHICLE TO COMMUNICATE

(71) Applicant: Orange, Paris (FR)

(72) Inventors: Jean-Marc Kelif, Chatillon (FR); William David Diego Maza, Chatillon (FR)

(73) Assignee: ORANGE, Paris (FR)

(*) Notice: Subject to any disclaimer, the term of this patent is extended or adjusted under 35 U.S.C. 154(b) by 70 days.

(21) Appl. No.: 16/843,384

(22) Filed: Apr. 8, 2020

(65) Prior Publication Data
US 2020/0329479 A1    Oct. 15, 2020

(30) Foreign Application Priority Data
Apr. 9, 2019 (FR) .................................. 1903769

(51) Int. Cl.
| | |
|---|---|
| H04W 4/46 | (2018.01) |
| H04W 72/08 | (2009.01) |
| H04L 5/16 | (2006.01) |
| H04L 67/104 | (2022.01) |

(52) U.S. Cl.
CPC ............ *H04W 72/082* (2013.01); *H04L 5/16* (2013.01); *H04L 67/104* (2013.01); *H04W 4/46* (2018.02)

(58) Field of Classification Search
CPC ......... H04B 15/00; H04L 5/14; H04L 5/1438; H04L 1/1825; H04W 4/40; H04W 4/46; H04W 72/082; H04W 72/1257

USPC .......................................... 370/252, 328, 329
See application file for complete search history.

(56) References Cited

U.S. PATENT DOCUMENTS

| | | | |
|---|---|---|---|
| 10,491,312 B1* | 11/2019 | Shimizu | ................ H04B 15/00 |
| 2018/0062824 A1 | 3/2018 | Noh et al. | |
| 2018/0167832 A1 | 6/2018 | Fang et al. | |
| 2018/0212746 A1* | 7/2018 | Kazmi | .................. H04L 1/1825 |
| 2019/0098649 A1* | 3/2019 | Baghel | ............. H04W 72/1257 |

FOREIGN PATENT DOCUMENTS

WO    WO 2016/111638 A1    7/2016

OTHER PUBLICATIONS

French Search Report and Written Opinion dated Dec. 9, 2019 for French Application No. 1903769.
Huusari et al., "Wideband Self-Adaptive RF Cancellation Circuit for Full-Duplex Radio: Operating Principle and Measurements," 2015 IEEE 81st Vehicular Technology Conference (VTC Spring), Glasgow, 2015, pp. 1-7.
Kelif et al., "Meeting Energy-Efficient and QoS Requirements of 5G Using D2D Communications" 2017 IEEE, pp. 1-7.

* cited by examiner

*Primary Examiner* — Harun Chowdhury
(74) *Attorney, Agent, or Firm* — Knobbe, Martens, Olson & Bear, LLP

(57) ABSTRACT

A method and device are disclosed for controlling a data-transmission mode used by a vehicle to communicate. In one aspect, the control method includes selectively activating, when a predefined condition C1 or C2 is met, a full-duplex data-transmission mode at a first vehicle to communicate with a second vehicle and with a base station of a network to which the first vehicle is connected.

15 Claims, 2 Drawing Sheets

[Fig. 1]
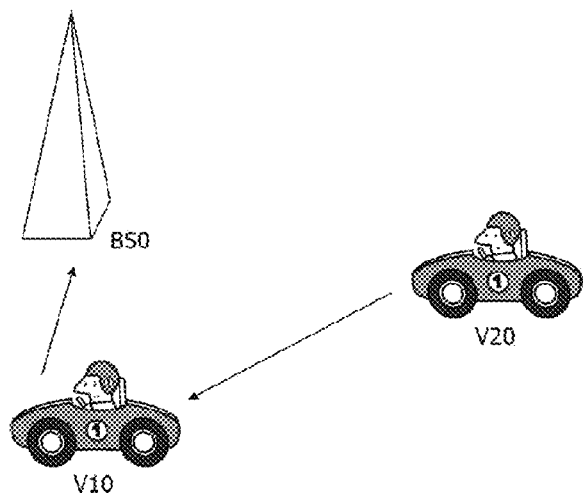
[Fig. 2]
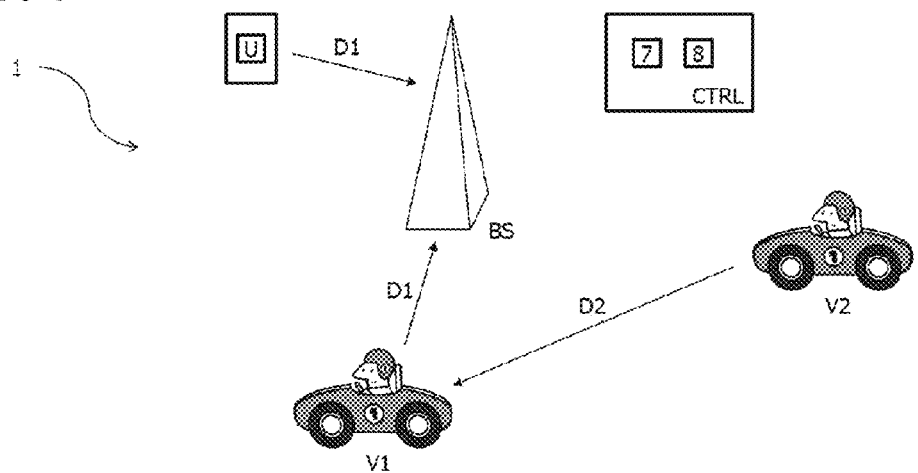
[Fig. 3]
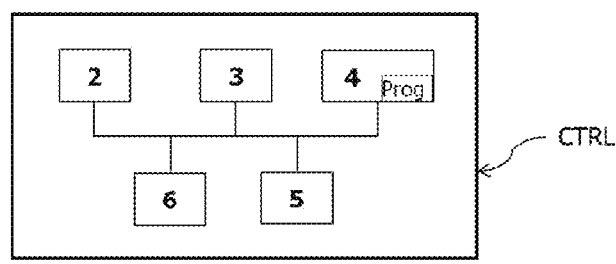

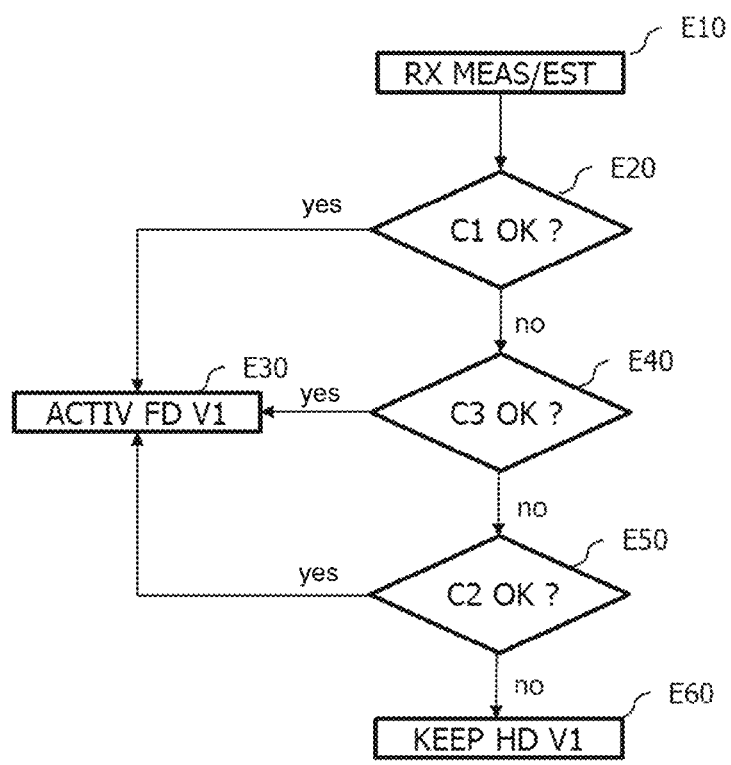
[Fig. 4]

METHOD AND DEVICE FOR CONTROLLING A DATA-TRANSMISSION MODE USED BY A VEHICLE TO COMMUNICATE

INCORPORATION BY REFERENCE TO ANY PRIORITY APPLICATIONS

Any and all applications for which a foreign or domestic priority claim is identified in the Application Data Sheet as filed with the application are hereby incorporated by reference under 37 CFR 1.57.

This application claims priority under 35 U.S.C. § 119(a) to French Patent Application No. 1903769, filed Apr. 9, 2019.

BACKGROUND

Technological Field

Embodiments described herein relate to the general field of telecommunications. Certain embodiments more particularly relate to communications in a wireless communication network, in which the devices connected to the network are able, apart from communicating with the elements of the network (i.e. with base stations or access points) to communicate together peer-to-peer.

Description of the Related Technology

By peer-to-peer communication between two devices, what is meant is the exchange of data between these two devices without passage via a central server. No limitation is placed on the type of data exchanged between the devices (voice, text, etc.) during such a peer-to-peer communication, nor on the connectivity technology used by the devices to detect the presence of neighboring devices and to connect thereto with a view to peer-to-peer communication. The devices may especially use Bluetooth, Wi-Fi (Wireless Fidelity), Wi-Fi Direct, LTE (Long-Term Evolution), etc.

Peer-to-peer communications are at this time provoking a large amount of interest. They have for example been shown to be an effective way of delivering resilient communication services in cases of intentional or unintentional rupture of conventional communication networks; they may also be used to decrease the load on conventional communication networks, or to protect against cyber surveillance, etc.

In the context of embodiments described herein, communications between two vehicles (in other words two devices capable of moving) and a base station of a wireless communication network are more particularly of interest. The vehicles in question are for example ground vehicles such as automobiles or trains, airborne vehicles such as drones, etc. The situation illustrated in FIG. 1, in which one of the vehicles in question sends (and/or receives) data to (and/or from) the base station via the other vehicle is more specifically considered. Such a situation may especially arise when one of the vehicles needs to send data to the base station, but the quality of the signal that it receives therefrom is insufficient, or even when one of the vehicles desires to transmit data to the base station but needs, to transmit these data, data held by the other vehicle. These examples are of course nonlimiting per se and merely given by way of illustration.

FIG. 1 shows a cellular wireless communication network comprising a base station BS0, and two vehicles V10 and V20 connected to the network. The vehicles V10 and V20 are for example moving automobiles. To receive or send data to the network, one of the two vehicles, for example the vehicle V20, must send or receive data to the base station, which manages the cell in which said vehicle is located, in this case the base station BS0. It is assumed here that, for some reason, the vehicle V20 must pass by the vehicle V10 to send and/or receive data to and/or from the base station BS0: thus, V20 sends data to V10 then V10 resends the data that it received from V20 (or a modified version of these data) to the base station BS0 (and vice versa for the data received by V10 from the base station and intended for V20).

In some implementations, the transmission from V20 to V10 and the transmission from V10 to the base station BS0 may not occur simultaneously using the same radio resource, typically the same frequency of the spectrum allocated to the network. In other words, the vehicles connected to the network are configured to operate in a half-duplex data-transmission mode allowing the level of interference experienced by the vehicle V10 to be limited and the quality of the signal received thereby to not be degraded.

The vehicle V10 cannot therefore receive data from the vehicle V20 and simultaneously send data (for example those that it receives from the vehicle V20 as it receives them or data derived from the data received from the vehicle V20) to the base station BS0 using the same frequency. As a result, the performance of the network, in particular in terms of data rate and spectral efficiency, are not optimized.

SUMMARY OF CERTAIN INVENTIVE CONCEPTS

Embodiments described herein aim to improve the previously described situation and to better use the resources of the network.

To this end, the disclosed technology provides a method for controlling, by a controller, a data-transmission mode intended to be used by a first vehicle to communicate with a second vehicle and with a base station of a wireless communication network, this method comprising:

a first step of determining whether a condition is met, said condition being:

| | |
|---|---:|
| $I_{1,1} < I_{1,U}$ | a condition C1: |
| $(W1/W2) \cdot \log(1+\mu_{HD,BS,1}) < 1/\varepsilon$ | or a condition C2: | with $\varepsilon = 1/\log(1+\mu_{FD,1,2}) - 1/\log(1+\mu_{HD,1,2})$, where:

W1 and W2 designate the bandwidths of the transmission channels between the first vehicle and the base station, and between the second vehicle and the first vehicle, respectively;

$I_{1,1}$ is a self-interference level reached at the first vehicle when it operates in full-duplex mode and sends data to the base station via (i.e. using) a radio resource over which it simultaneously receives data from the second vehicle;

$I_{1,U}$ is an interference level generated at the first vehicle by a third communication device, when the third communication device sends data to the base station via (i.e. using) a radio resource over which the first vehicle simultaneously, in half-duplex mode, receives data from the second vehicle;

$\mu_{HD,BS,1}$ is a signal-to-interference-plus-noise ratio (SINR) received by the base station when the first vehicle, in half-duplex mode, sends data to the base station;

$\mu_{FD,1,2}$ is an SINR received at the first vehicle when the first vehicle, in full-duplex mode, receives data originating from the second vehicle via a radio resource over which the first vehicle simultaneously sends data to the base station; and $\mu_{HD,1,2}$ is an SINR received at the first vehicle when the first vehicle, in half-duplex mode, receives data from the second vehicle;

a step of activating a full-duplex data-transmission mode at the first vehicle if the condition is met.

Correlated, the disclosed technology also relates to a controller configured to control a data-transmission mode used by a first vehicle to communicate with a second vehicle and with a base station of a wireless communication network, said controller comprising:

a determining module configured to determine whether a condition is met, said condition being:

$$I_{1,1} < I_{1,U}; \text{ or} \qquad \text{a condition C1:}$$

$$(W1/W2)\cdot\log(1+\mu_{HD,BS,1}) < 1/\varepsilon \qquad \text{a condition C2:}$$

with $\varepsilon = 1/\log(1+\mu_{HD,1,2}) - 1/\log(1+\mu_{HD,1,2})$, where:

W1 and W2 designate the bandwidths of the transmission channels between the first vehicle and the base station, and between the second vehicle and the first vehicle, respectively;

$I_{1,1}$ is a self-interference level reached at the first vehicle when it operates in full-duplex mode and sends data to the base station via a radio resource over which it simultaneously receives data from the second vehicle;

$I_{1,U}$ is an interference level generated at the first vehicle by a third communication device, when the third communication device sends data to the base station via a radio resource over which the first vehicle simultaneously, in half-duplex mode, receives data from the second vehicle;

$\mu_{HD,BS,1}$ is a signal-to-interference-plus-noise ratio (SINR) received by the base station when the first vehicle, in half-duplex mode, sends data to the base station;

$\mu_{HD,1,2}$ is an SINR received at the first vehicle when the first vehicle, in full-duplex mode, receives data originating from the second vehicle via a radio resource over which the first vehicle simultaneously sends data to the base station; and $\mu_{HD,1,2}$ is an SINR received at the first vehicle when the first vehicle, in half-duplex mode, receives data from the second vehicle;

an activating module configured to activate a full-duplex data-transmission mode at the first vehicle if the condition is met.

It will be noted that no assumption is made as to the nature of the third communication device. It may be a question of any type of user equipment, whether fixed or moving, that is able to communicate with the base station of the network and/or peer-to-peer with other devices of the network.

In an exemplary embodiment of the disclosed technology, the data transmitted by the first vehicle to the base station comprise the data (in original or modified form) transmitted by the second vehicle to the first vehicle (they may moreover in addition comprise other data). This example especially models the case where the first vehicle serves as relay to the base station for the second vehicle, to send on the data thereof. It will be noted that the disclosed technology may also be applied in other contexts, including when the data transmitted by the first vehicle to the base station comprise only one portion of the data received from the second vehicle (in original or modified form), or even data different from those received from the second vehicle.

As known, a full-duplex data-transmission mode is a data-transmission mode in which the data are transferred to and from the devices implementing this transmission mode bidirectionally and simultaneously: thus each device is able to send and receive data simultaneously using the same radio resource, for example the same frequency or the same frequency band. When the first vehicle is configured in a full-duplex transmission mode, it may therefore receive data from the second vehicle over a radio resource (e.g. at a given frequency) and simultaneously send data to the base station over the same radio resource.

Because of the simultaneous use of the same radio resource, this allows the time taken to transmit data from the second vehicle to the base station via the first vehicle to be decreased while preserving the radio resources of the network. The spectral efficiency of the network is thus improved with respect to the prior art in which solely a half-duplex transmission mode is envisioned.

Furthermore, the energy efficiency of the first vehicle is also increased: the time for which the first vehicle must remain active to receive data from the second vehicle and to send data to the base station is decreased in full-duplex mode, this allowing the first vehicle to decrease its energy consumption (and thus to save its energy resources).

To achieve this result, embodiments of the disclosed technology advantageously activate the full-duplex data-transmission mode in the first vehicle when the controller determines that a predefined condition, which is chosen at least from the aforementioned conditions C1 and C2, is met. The conditions C1 and C2 have advantageously been defined to guarantee that the transmission time required in full-duplex mode to transfer data from the second vehicle to the first vehicle and from the first vehicle to the base station is shorter than the corresponding transmission time required in half-duplex mode, without however sacrificing the performance achieved during this transmission in terms of error probability. Specifically, the two conditions C1 and C2 have been derived using Shannon's law, which gives the capacity of a channel as a function of the signal-to-interference-plus-noise ratio (SINR) on this channel. As known per se, the capacity of a channel designates the upper limit of the data rate that can be transmitted reliably over this channel, i.e. with an error probability that tends to zero.

Thus, since the full-duplex transmission mode moreover allows radio resources to be economized and a better spectral efficiency to be achieved, this means that when either of conditions C1 and C2 is met, there is every reason to activate the full-duplex mode in the first vehicle as the disclosed technology proposes, because performance is optimized in every way (time saved, spectral efficiency improved and energy consumption in the first vehicle decreased).

It should be noted that the condition C1 is simpler for the controller to examine that the condition C2, especially because of the quantities that it calls into play. Specifically, it is enough for the controller to compare two levels of interference that it may easily obtain from the first vehicle and from the third device or derive from information obtained from the first vehicle and the third device to determine whether the condition C1 is met.

No limitation is placed on the way in which the controller determines whether the predefined condition C1 or C2 is met or not. It may for example be a question of evaluating and comparing the SINR or the implied ratios under these conditions, of demonstrating the inverse relationships, of considering approximations of the terms of these conditions, etc.

Thus, for example, the self-interference level $I_{1,1}$ may easily be derived from the self-interference factor of the first vehicle and from its emission power when it sends data to the base station. As is known per se, the self-interference factor expresses residual interference after cancellation by the first vehicle of interference generated by the other devices of the network using the same radio resources as it, which is due to the transmission by the first vehicle of data at the same time and over the same radio resource (e.g. frequency) that it receives data over (in other words, its operation in full-duplex mode). It will be noted that the cancellation of interference may be carried out by the first vehicle by means of an interference-cancelling algorithm that is known per se, such as for example successive- or parallel-interference cancelling algorithm or a self-interference cancelling algorithm.

By way of illustration, if the first vehicle has an emission power P1 and a self-interference factor of 1, the self-interference level at the first vehicle due to this transmission is equal to P1. If the self-interference factor is equal to −70 dB, the self-interference level due to this transmission is equal to $P1 \times 10^{-7}$.

In another embodiment, to determine whether the condition C1 is met, the controller may estimate the ratios $\mu_{FD,1,1}=I_{1,1}/(I_{oth}+N_{th})$ and $\mu_{HD,1,U}=I_{1,U}/(I_{1,U}+I_{oth}+N_{th})$ and verify whether:

$$\mu_{FD,1,1} < \mu_{HD,1,U}/(1-\mu_{HD,1,U})$$

In one particular embodiment, in which the first determining step consists in determining whether the condition C1 is met, the control method comprises comparing:
- a distance between the first vehicle and the third communication device; with
- a ratio, raised to the power of n, where n designates the inverse of a pathloss exponent:
  of a product of a propagation factor multiplied by an emission power of the third device when said third communication device sends data to the base station on a radio resource over which the first vehicle, in half-duplex mode, simultaneously receives data from the second vehicle, and
  of the self-interference level $I_{1,1}$;
- the condition C1 being met if the distance is lower than the ratio.

This embodiment is a simple alternative to the computation of the ratios $\mu_{FD,1,1}$ and $\mu_{FD,1,3}$ to determine whether the condition C1 is met or not. It results from an approximation of the interference $I_{1,U}$ generated by the third communication device, this approximation being based on the emission power of the third communication device, on the propagation parameters expressing the attenuation of this power by the propagation channel separating the first vehicle from the third communication device, and on the relative position of the first vehicle with respect to the third communication device. Such an approximation is known per se and models the propagation of waves through free space.

To implement this embodiment, the control method may furthermore comprise:
- a step of receiving, from the first vehicle, the self-interference level $I_{1,1}$ or a self-interference factor of the first vehicle and an emission power of the first vehicle; and/or
- a step of receiving, from the third communication device or said base station, the emission power of the third communication device.

The distance between the moving first device and the third communication device may moreover be easily determined by the controller from a position of the first vehicle, which is measured by the first vehicle, and/or a position of the third communication device, which is measured by the third communication device. To this end, the first vehicle and/or the third communication device may be equipped with a receiver of GPS (Global Positioning System) type allowing them to determine their location.

As mentioned above, the condition C1 may prove to be simpler to analyze than the condition C2. Thus, in one particular embodiment, it is possible to envision hierarchizing the analysis by the controller of the conditions C1 and C2.

More precisely, in this embodiment, the first determining step consists in determining whether the condition C1 is met, and if the condition C1 is not met, the method furthermore comprises:
- a second step of determining whether the condition C2 is met; and
- a step of activating the full-duplex data-transmission mode in the first vehicle if the condition C2 is met.

This embodiment allows the use of the radio resources of the network to be even further optimized. Specifically, the inventors have been able to demonstrate, again using Shannon's law, that when the condition C1 is not met, it is still possible, under the condition C2, to achieve a transmission time in full-duplex mode shorter than the transmission time in half-duplex mode.

This embodiment therefore proposes, to determine whether the full-duplex mode must be activated at the first vehicle, to test the two conditions C1 and C2 in order to take the greatest possible advantage of the use of the full-duplex transmission mode. The two conditions are tested in an advantageous order consisting in first testing the condition C1 then, only if the latter is not met, testing the condition C2. This advantageous order allows the resources of the controller to be optimized.

In another embodiment, the first determining step consists in determining whether the condition C1 is met, and if the condition C1 is not met, the method furthermore comprises:
- a third step of determining whether a condition C3 such that:

$$\mu_{FD,1,1} < \mu_0/[\exp(1/(B+C))-1]-1$$

is met with:

$$\mu_{FD,1,1}=I_{1,1}/(I_{oth}+N_{th})$$

$$B=1/\log(1+\mu_0(1-\mu_{HD,1,U}))$$

$$C=W2/[W1 \cdot \log(1-\mu_{HD,BS,1})]$$

$$\mu_0=P_2^{(1)}/(I_{oth}+N_{th})$$

$$\mu_{HD,1,U}=I_{1,U}/(I_{1,U}+I_{oth}+N_{th})$$

where:
- $P_2^{(1)}$ is a power of the data received by the first vehicle from the second vehicle;
- $I_{oth}$ is an interference level generated at the first vehicle by at least one fourth device sending data via (using) a radio resource over which the first vehicle, in full-duplex mode, simultaneously sends data to the base station and receives data from the second vehicle or over which the first vehicle, in half-duplex mode, simultaneously receives data from the second vehicle; and
- $N_{th}$ is a noise level received by the first vehicle;
- a step of activating the full-duplex data-transmission mode at the first vehicle if the condition C3 is met.

This embodiment proposes to test a new condition C3 to determine whether it will be advantageous to activate the full-duplex transmission mode in the first vehicle. In this embodiment, the condition C3 is tested only after the condition C1, if the condition C1 is not met. It will be noted that the analysis of the condition C3 presents an intermediate level of difficulty to the controller with respect to the analysis of the condition C1 and to the analysis of the condition C2.

Thus, it is possible to envision completing this embodiment, if the condition C3 is not met, with:
- a fourth step of determining whether condition C2 is met; and
- a step of activating the full-duplex data-transmission mode at the first vehicle if the condition C2 is met.

This embodiment allows all or some of the conditions guaranteeing that the transmission time in full-duplex mode is shorter than the transmission time in half-duplex mode to be tested while economizing, when it is possible, the resources of the controller.

In one particular embodiment, the first, and where appropriate, the second, the third and the fourth determining step are reproduced at various times.

These various times may be separated by a regular time period; in other words, the controller re-evaluates the one or more conditions C1, C2, C3 periodically, or even quasi-continuously if the time period is chosen to be relatively small. This allows changing conditions liable to be experienced by the first vehicle and/or the second vehicle to be adapted to and the advantageousness of actuating the full-duplex transmission mode in the first vehicle to be re-evaluated at various times. Specifically, since the first and second vehicles are moving, the various quantities evaluated in the context of the disclosed technology (SINR and other ratios) are liable to vary as a function of time, and especially as a function of the speed of the first vehicle.

As a variant, the various times at which the determining steps are reproduced may correspond to the detection, by the controller, of predefined events, such as for example the detection of a new communication device (different from the third communication device) sending data to the base station using the same radio resource as the first and second vehicle, of a peer-to-peer communication between new vehicles, etc.

It may furthermore be envisioned, if the controller determines that all of conditions C1, C2 and C3 are no longer met at a given time and the first vehicle is in full-duplex mode, for this full-duplex mode to be deactivated at the first vehicle.

In one particular embodiment, the first, and where appropriate, the second, third and fourth determining steps are carried out if a data-transmission rate between the second vehicle and the first vehicle is lower than a data-transmission rate between the first vehicle and the base station.

It will be noted that this particular case in which the transmission rate over the cellular network is better than the peer-to-peer transmission rate is the case that is most often encountered in practice.

In this embodiment, when the data-transmission rate between the second vehicle and the first vehicle is higher than the data-transmission rate between the first vehicle and the base station, the control method may furthermore comprise:
- a fifth step of determining whether a condition is met, said condition being chosen among:

$$\mu_{FD,BS,1} > \exp(1/A) - 1 \quad \text{a condition C4:}$$

with $A = \alpha/\log(1-\mu_{HD,1,2}) + 1/\log(1+\mu_{HD,BS,1})$ and $\alpha = (VOL2/VOL1) \cdot (W1/W2)$, where $\mu_{FD,BS,1}$ designates the SINR received by the base station when the first vehicle, in full-duplex mode, sends a volume VOL1 of data to the base station BS and simultaneously receives over the same radio resource a volume VOL2 of data from the second vehicle, and $$1/[W2 \cdot \log(1+\mu_{FD,1,2})] < 1/[W2 \cdot \log(1-\mu_{HD,1,2})] + (VOL1 \cdot W2)/[VOL2 \cdot W1 \cdot \log(1+\mu_{HD,BS,1})] \quad \text{a condition C5:}$$

- a step of activating the full-duplex data-transmission mode in the first vehicle if said condition chosen among the conditions C4 and C5 is met.

This embodiment is very complete and allows more marginal cases in which the peer-to-peer transmission rate is better than the transmission rate over the cellular network to be treated, whatever the volumes of data transmitted from the second vehicle to the first vehicle and from the first vehicle to the base station.

In one particular embodiment, the various steps of the control method are determined by the instructions of computer programs.

The disclosed technology also relates to a computer program on a storage medium, this program being capable of being implemented in a computer or more generally in a controller. This program contains instructions suitable for implementing a control method such as described above.

This program may use any programming language, and take the form of source code, object code or of a code intermediate between source code and object code, such as in a partially compiled form, or any other desirable form.

The disclosed technology also relates to a data medium or a storage medium that is readable by a computer, and containing instructions of the computer program such as mentioned above.

This data or storage medium may be any entity or device capable of storing the programs. For example, the media may comprise a storage means, such as a ROM, for example a CD-ROM or a microelectronic circuit ROM, or even a magnetic storage means, for example a hard disk or a flash memory.

Furthermore, the storage or data medium may be a transmissible medium such as an electrical or optical signal that may be transferred via an electrical or optical cable, via a radio link, via a wireless optical link or via other means.

The program according to the mention may in particular be downloaded over the Internet.

Alternatively, the data or storage medium may be an integrated circuit into which a program is incorporated, the circuit being suitable for executing or for being used in the execution of the communicating method or the selecting method.

According to another aspect, the disclosed technology also relates to a transmission system comprising:
- at least a first vehicle, a second vehicle and a base station of a wireless communication network, the first vehicle and the second vehicle being able to communicate together peer-to-peer and with the base station; and
- a controller, configured to control a data-transmission mode used by the first vehicle to communicate with the second vehicle and with the base station.

The controller may be located for example in a base station or in a centralized management entity of the wireless communication network.

The transmission system has the same advantages as those mentioned above with respect to the control method and controller.

It is also possible to envision, in other embodiments, the controlling method, the controller and the transmission system having in combination all or some of the aforementioned features.

BRIEF DESCRIPTION OF THE DRAWINGS

Other features and advantages of the disclosed technology will become apparent from the description given below with reference to the appended drawings, which illustrate an example of a completely nonlimiting embodiment thereof. In the figures:

FIG. 1, which has already been described, shows a cellular network in which a vehicle V20 sends data to a base station BS0 via a vehicle V10;

FIG. 2 shows, in its environment, a transmission system, in one particular embodiment;

FIG. 3 schematically illustrates the hardware architecture of a controller, in one particular embodiment; and FIG. 4 shows, in the form of a flowchart, the main steps implemented by the controller of FIG. 3 to determine the data-transmission mode applied by a vehicle of the transmission system of FIG. 2, in one particular embodiment.

DETAILED DESCRIPTION OF CERTAIN ILLUSTRATIVE EMBODIMENTS

FIG. 2 shows, in its environment, a transmission system 1, in one particular embodiment.

This transmission system 1 is integrated into a cellular wireless network NW, each cell of which is managed by a base station. No limitation is placed on the nature of the network, nor on the number of cells that it contains. It may for example be a question of a $4^{th}$ or $5^{th}$ generation (i.e. 4G or 5G) wireless network. The wireless network NW allows various types of user equipments to communicate together, such as for example terminals such as cell phones, computers or tablet computers, but also various connected objects, which may be fixed or moving, and especially vehicles (e.g. automobiles, drones, trains, etc.). It is assumed that these connected objects may communicate together via the wireless network NW, but also peer-to-peer, for example when they are located in proximity to one another, or when their connection with the network NW has failed, etc. No limitation is placed on the reason why a peer-to-peer communication between two connected objects in the context of the disclosed technology is triggered.

In the example envisioned in FIG. 2, the transmission system 1 more particularly comprises:

a base station BS managing a cell (not shown) of the network NW, and allowing user equipments located in the cell to connect to the network NW thereby;

a first vehicle V1 and a second vehicle V2, which are here connected to the network NW, and which are also able to communicate together peer-to-peer. It is here assumed that these vehicles are moving;

a user equipment U, connected to the network NW via the base station BS. This user equipment is for example, by way of illustration, a terminal of a user, such as a cell phone, but no limitation is placed on the nature of this user equipment, which may indifferently be fixed or mobile, i.e. moving; and a controller CTRL.

It is assumed here that each of the user equipments in question (vehicles V1 and V2 and user equipment U) are equipped with an interference-cancelling module, for example implementing a successive- or parallel-interference cancelling algorithm and/or a self-interference cancelling algorithm in user equipments required to operate in full-duplex mode. Such a module is known to those skilled in the art and is not described further here.

A transmission of data D2 from the vehicle V2 to the vehicle V1 via a peer-to-peer link, and a transmission of data D1 via the wireless network NW from the vehicle V1 to the base station BS will here be considered by way of illustration. In the considered example, the data D1 comprise the data D2 transmitted by the vehicle V2, and may optionally comprise additional data added by the vehicle V1. In other words, the volume, denoted VOL1, of the data D1 is larger than or equal to the volume, denoted VOL2, of the data D2.

It is moreover assumed that the various user equipments connected to the network NW and the base station BS communicate together via the network NW or peer-to-peer, and are configured by default to adopt, during their communications, a half-duplex data-transmission mode, the latter limiting the interference generated during these communications.

This assumption is of course nonlimiting per se and other situations in which a plurality of user equipments communicate together peer-to-peer whereas at least one thereof communicates via the network NW with the base station BS may be envisioned.

According to the disclosed technology, in such a situation, the controller CTRL controls the transmission mode used by the vehicle V1, which is involved at a given time in two communications with the vehicle V2 and the base station BS, respectively. More precisely, it is a question, for the controller CTRL, of selecting, for the vehicle V1, a data-transmission mode from:

a half-duplex data-transmission mode in which the vehicle V1 can communicate, i.e. send and receive data, only with a single device at a given time using a given radio resource (for example one frequency of the spectrum allocated to the wireless network NW); and a full-duplex data-transmission mode in which the vehicle V1 can simultaneously send data to a device and receive data from a device using the same radio resource (for example one frequency of the spectrum allocated to the wireless network NW).

To this end, the controlling method is implemented within the controller CTRL by means of software and/or hardware components that define various duly configured functional modules (modules for determining, activating, etc.).

More particularly, in the embodiment described here, the controller CTRL is integrated into a centralized management entity of the wireless network NW (for example into a server of the network NW) and has the hardware architecture of a computer, such as schematically illustrated in FIG. 3. It especially comprises a processor 2, a random-access memory 3, a read-only memory 4, a nonvolatile flash memory 5 and communication means 6 allowing it to communicate with the various user equipments connected to the wireless network NW (especially via, in the example envisioned here, the base station BS).

The read-only memory 4 of the controller CTRL is here a storage medium, which is readable by the processor 2 and on which is stored in a computer program PROG, containing instructions for executing the steps of a controlling method.

In other words, the computer program PROG defines the various functional modules of the controller CTRL that allow it to implement the controlling method, namely, in the embodiment described here (see FIG. 2):

a determining module 7, configured to determine whether a predefined condition C (detailed further below) is met; and an activating module 8, configured to activate where appropriate (i.e. if the condition C is met) a full-duplex transmission mode in the vehicle V1 with a view to communicating with the vehicle V2 and the base station BS.

In another embodiment, the controller CTRL may be integrated into a device other than a centralized management entity of the network NW, such as for example into a base station of the network NW (e.g. into the base station BS), or into a user equipment of the network NW.

According to the disclosed technology, the controller CTRL is configured to activate the full-duplex transmission mode at the vehicle V1, during its communications with the vehicle V2 and with the base station BS, when a set condition C is met. In the embodiment described here, the controller CTRL, and more particularly its determining module 7, is configured to test hierarchically a plurality of conditions denoted C1, C2 and C3. As a variant, it is possible to envision there being as many determining modules as there are conditions to be tested.

More specifically, the determining module 7 of the controller CTRL is configured to first test the condition C1, then if the condition C1 is not met, to test the condition C3, then if the condition C3 is not met, to test the condition C2. This embodiment advantageously allows the conditions C1, C2 and C3 to be tested in order of increasing complexity.

As a variant, a different hierarchy may be adopted, or fewer conditions may be tested, as detailed further below. Preferably however, at least and firstly the condition C1, which is the condition that is the simplest to check, will be tested.

The conditions C1, C2 and C3 are respectively defined in the following way:

$I_{1,1} < I_{1,U}$  Condition C1:

$(W1/W2) \cdot \log(1+\mu_{HD,BS,1}) < 1/\varepsilon$  Condition C2:

with $\varepsilon = 1/\log(1+\mu_{FD,1,2}) - 1/\log(1+\mu_{HD,1,2})$;

$\mu_{FD,1,1} < \mu_0/(\exp(1/(B+C))-1)-1$  Condition C3:

is met with:

$B = 1/\log(1+\mu_0(1-\mu_{HD,1,U}))$, $C = W2/[W1 \cdot \log(1+\mu_{HD,BS,1})]]$, and $\mu_{HD,1,U} = I_{1,U}/(I_{1,U}+I_{oth}+N_{th})$, where:

W1 and W2 designate the bandwidths of the transmission channels between the vehicle V1 and the base station BS, and between the vehicle V2 and the vehicle V1, respectively;

$I_{1,1}$ is a self-interference level reached at the vehicle V1 when the latter operates in full-duplex mode and sends data D1 to the base station BS via a radio resource over which it simultaneously receives data D2 from the vehicle V2. In the example envisioned here, this radio resource is a given frequency f0 of the frequency spectrum allocated to the network NW;

$I_{1,U}$ is an interference level generated at the vehicle V1 by a communication device (for example in the example envisioned here, by the user equipment U) other than the vehicles V1 and V2 (third device as meant in the context of the disclosed technology), when this device U sends data D to the base station BS via (using) a radio resource f0 over which the vehicle V1 simultaneously, in half-duplex mode, receives data D2 from the vehicle V2. It will be noted that it is here assumed, for the sake of performance, that the base station BS can at a given time receive data over a radio resource (in this case at the frequency f0) only from a single user equipment connected to said base station BS;

$I_{oth}$ is an interference level generated at the vehicle V1 by other communication devices (i.e. devices different from the vehicle V1, from the vehicle V2 and from the user equipment U) sending data via (using) a radio resource (in the case here at the frequency f0) over which the vehicle V1, in full-duplex mode, simultaneously sends data D1 to the base station BS and receives data D2 from the vehicle V2 or over which the vehicle V1, in half-duplex mode, simultaneously receives data D2 from the vehicle V2;

$N_{th}$ is a noise level received by the vehicle V1 (in full-duplex mode or in half-duplex mode);

$\mu_{HD,BS,1}$ is a signal-to-interference-plus-noise ratio (SINR) received by the base station BS when the vehicle V1, in half-duplex mode, sends data D1 to the base station BS;

$\mu_{FD,1,2}$ is an SINR received at the vehicle V1 when the vehicle V1, in full-duplex mode, receives data D2 originating from the vehicle V2 via a radio resource (in the case here at the frequency f0) over which the vehicle V1 simultaneously sends data D1 to the base station BS; and $\mu_{HD,1,2}$ is an SINR received at the vehicle V1 when the vehicle V1, in half-duplex mode, receives data D2 from the vehicle V2; and $\mu_0$ to is a ratio of a power of the data D2 received by the vehicle V1 from the vehicle V2, and of the sum of the interference level $I_{oth}$ and of the noise level $N_{th}$.

To derive the conditions C1-C3, which are considered according to the disclosed technology with a view to triggering at the vehicle V1 the full-duplex data-transmission mode, situations were considered that would lead to a transmission time $T_{FD}(D2,D1)$ of the data D2 from the vehicle V2 to the vehicle V1 and of the data D1 from the vehicle V1 to the base station BS if the vehicle V1 were operating in full-duplex mode, shorter than the corresponding transmission time $T_{HD}(D2,D1)$ if the vehicle V1 were operating in half-duplex mode. The vehicle V2 here operates in half-duplex mode.

In full-duplex mode, the data D1 and D2 may be sent and received simultaneously over the same radio resource (here frequency f0); thus, the transmission time $T_{FD}(D2,D1)$ is equal to:

$T_{FD}(D2,D1) = VOL2/(\min(R_{FD}(D2),R_{FD}(D1)) + (VOL1-VOL2)/R_{FD}(D1)$ where $R_{FD}(D2)$ and $R_{FD}(D1)$ respectively designate the data rate of the link between the vehicle V2 and the vehicle V1 and the data rate of the link between the vehicle V1 and the base station BS when the vehicle V1 operates in full-duplex mode (it is assumed here that as soon as the vehicle V1 starts to receive data (which are referred to as "first data") from the vehicle V2, it is able to send data to the base station BS and the time required for these first data to reach the vehicle V1 is neglected).

In half-duplex mode, the data D1 and D2 cannot be sent and received simultaneously over the same radio resource (here frequency f0); thus, the transmission time $T_{HD}(D1,D2)$ is equal to:

$T_{HD}(D2,D1) = T_{HD}(D2) + T_{HD}(D1) = VOL2/R_{HD}(D2) + VOL1/R_{HD}(D1)$ where:

$T_{HD}(D2)$ and $T_{HD}(D1)$ designate the transmission times when the vehicle V1 operates in half-duplex mode of the data D2 from the vehicle V2 to the vehicle V1 and of the data D1 from the vehicle V1 to the base station BS, respectively; and $R_{HD}(D2)$ and $R_{HD}(D1)$ designate the data rate of the link between the vehicle V2 and the vehicle V1 and the data rate of the link between the vehicle V1 and the base station BS when the vehicle V1 operates in half-duplex mode, respectively.

The inventors have therefore judiciously determined three conditions C1, C2 and C3 allowing the following inequality (1) to be obtained:

$$VOL2/(\min(R_{FD}(D2),R_{FD}(D1))+(VOL1-VOL2)/R_{FD}(D1)<VOL2/R_{HD}(D2)+VOL1/R_{HD}(D1)$$

In order to not sacrifice the performance in terms of transmission of the data D1 and D2 in full-duplex mode, the inventors have cleverly converted this inequality (1) in terms of SINR using Shannon's law, which gives the capacity of a transmission channel as a function of the SINR of the channel. As is known per se, the capacity of a channel designates the upper limit, here denoted Rmax, of the data rate that may be reliably transmitted over this channel, i.e. with an error probability that tends to zero, as a function of the SINR received via this channel. More particularly, the inventors have here used the following relationship:

$$R\max=W\log(1+\text{SINR})$$

where W designates the bandwidth of the channel in question. It will be noted that the log may either be a logarithm to base 2 or 10, or a Napierian logarithm depending on the units used for Rmax (e.g. logarithm to the base 2 for a capacity expressed in bits/s).

The upper limit given by Shannon's law has been used to express the data rates $R_{FD}(D2)$, $R_{FD}(D1)$, $R_{HD}(D2)$ and $R_{HD}(D1)$ featuring in inequality (1). More precisely, the following assumptions are made:

the data transmission rate $R_{FD}(D2)$ is approximated by:

$$R_{FD}(D2)=W2\cdot\log(1+\mu_{FD,1,2})$$

where $\mu_{FD,1,2}$ designates, as indicated above, the SINR received at the vehicle V1 when the vehicle V1, in full-duplex mode, receives data D2 from the vehicle V2 at the frequency f0 and simultaneously sends at said same frequency the data D1 to the base station BS. The SINR $\mu_{FD,1,2}$ may be written in the form, with the notations introduced above:

$$\mu_{FD,1,2}=P_2^{(1)}/(I_{1,1}+I_{oth}+N_{th})$$

In this expression, $P_2^{(1)}$ designates the power of the data D2 received by the vehicle V1, and $I_{1,1}$ is the self-interference level reached at the vehicle V1 when the latter operates in full-duplex mode, or in other words the interference level generated by the vehicle V1 itself. This self-interference level corresponds to the residual interference level after the vehicle V1 has cancelled interference affecting the data D2 transmitted by the vehicle V2. It is for example described in the document by T. Huusari et al. entitled "Wideband Self-Adaptive RF Cancellation Circuit for Full-Duplex Radio: Operating Principle and Measurements", IEEE Vehicular Technology Conference, March 2015, and may be expressed in the form of the product of a so-called self-interference factor β of the vehicle V1 multiplied by the emission power $P_1$ used by the vehicle V1 to send the data D1 to the base station BS (i.e. $I_{1,1}=\beta\cdot P_1$);

the data transmission rate $R_{HD}(D1)$ has been approximated by:

$$R_{HD}(D1)=W1\cdot\log(1+\mu_{HD,BS,1})$$

where $\mu_{HD,BS,1}$ is, as indicated above, the SINR received by the base station BS when the vehicle V1, in half-duplex mode, sends the data D1 to the base station BS. The SINR $\mu_{HD,BS,1}$ may be written in the form, with the notations introduced above:

$$\mu_{HD,BS,1}=P_1^{(BS)}/(I_{oth}+N_{th})$$

where $P_1^{(BS)}$ designates the power of the data D1 received by the base station BS from the vehicle V1;

the data transmission rate $R_{HD}(D2)$ has been approximated by:

$$R_{HD}(D2)=W2\cdot\log(1+\mu_{HD,1,2})$$

where $\mu_{HD,1,2}$ is, as indicated above, the SINR received at the vehicle V1 when the vehicle V1, in half-duplex mode, receives the data D2 from the vehicle V2. To express the SINR $\mu_{HD,1,2}$ while taking into account interference liable to be generated on the network NW, the realistic assumption, which is moreover commonly employed, has been made that the base station BS can, at a given time and over a given radio resource, receive data only from at most one user equipment connected to the network NW. Since the vehicle V1 is operating in half-duplex mode and is receiving the data D2 at the frequency f0, it therefore does not simultaneously send data to the base station BS. Another user equipment connected to the network NW (namely the user equipment U here) is therefore capable of simultaneously sending data (the data D) to the base station BS at the frequency f0 when the vehicle V2 sends data D2 to the vehicle V1. This user equipment U generates, by sending its data D to the base station BS, interference denoted $I_{1,U}$ on the data D2 received by the vehicle V1. In light of these observations, the SINR $\mu_{HD,1,2}$ may then be written in the form:

$$\mu_{HD,1,2}=P_2^{(1)}/(I_{1,U}+I_{oth}+N_{th}).$$

To obtain the conditions C1 to C3, it was assumed that the data transmission rate in full-duplex mode between the vehicles V1 and V2 is lower than the data transmission rate in full-duplex mode over the network NW between the vehicle V1 and the base station BS, i.e. that:

$$R_{FD}(D2)<R_{FD}(D1)$$

It will be noted that this assumption is in practice most often correct in the context of FIG. 2 in which a vehicle V2 sends data to a vehicle V1 so that the latter may then send them in turn to the base station BS in their original version or in a modified form, i.e. optionally completed with other data.

In this case, the inequality (1) may be written in the form:

$$VOL2/R_{FD}(D2)+(VOL1-VOL2)/R_{FD}(D1)<VOL2/R_{HD}(D2)+VOL1/R_{HD}(D1)$$

It may moreover be shown, using Shannon's law, that $R_{FD}(D1)<R_{HD}(D1)$, because of the interference generated in full-duplex mode at the base station BS, which is greater than the interference generated in half-duplex mode. Therefore, the above inequality may be written:

$$VOL2/R_{FD}(D2)<VOL2/R_{HD}(D2)+VOL2/R_{HD}(D1)$$

With reference to the expressions of the data rates $R_{FD}$(D2), $R_{HD}$(D2) and $R_{HD}$(D1) provided above, the following inequality (2) is obtained:

$$1/[W2 \cdot \log(1+\mu_{FD,1,2})] < 1/[W2 \cdot \log(1+\mu_{HD,1,2})] + 1/[W1 \cdot \log(1+\mu_{HD,BS,1})]$$

i.e.

$$1/\log(1+\mu_{FD,1,2}) < 1/\log(1+\mu_{HD,1,2}) + W2/[W1 \cdot \log(1+\mu_{HD,BS,1})] \quad (2)$$

It was noted that if $\mu_{FD,1,2} > \mu_{HD,1,2}$, inequality (2) is always respected. In other words, by subjecting the expressions $\mu_{HD,1,2}$ and $\mu_{FD,1,2}$ derived above to this condition, it is found that inequality (2) is always respected if:

$$P_2^{(1)}/(I_{1,1}+I_{oth}+N_{th}) > P_2^{(1)}/(I_{1,U}+I_{oth}+N_{th})$$

i.e. when the following condition C1 is met:

$$I_{1,1} = \beta \cdot P_1 < I_{1,U}$$

which may be written equivalently in the following form (C1'):

$$\mu_{FD,1,1} < \mu_{HD,1,U}/(1-\mu_{HD,1,U})$$

with $$\mu_{FD,1,1} = I_{1,1}/(I_{oth}+N_{th}) \text{ and } \mu_{HD,1,U} = I_{1,U}/(I_{1,U}+I_{oth}+N_{th})$$

It will be noted that the condition referenced C1' is a condition equivalent to the condition C1 (i.e. C1 is met if and only if C1' is met). In the context of the disclosed technology, testing a condition or determining whether a condition is met includes testing the exact terms of the condition, or testing an equivalent condition. In this case, to determine whether the condition C1 is met, it is possible to estimate and compare the terms $I_{1,1}$ and $I_{1,U}$ but it is also possible, as a variant, to estimate and compare the terms $\mu_{FD,1,1}$ and $\mu_{HD,1,U}/(1-\mu_{HD,1,U})$, or the terms of another equivalent relationship.

To obtain the condition C2, case was considered where, although the condition C1 or equivalently C1' is not met, inequality (2) remains valid, or in other words the transmission time in full-duplex mode remains shorter than the transmission time in half-duplex mode.

It is easily possible to show that:

$$\mu_{HD,1,2} = \mu_0(1-\mu_{HD,1,U})$$

with $\mu_0 = P_2^{(1)}/(I_{oth}+N_{th})$ and:

$$\mu_{FD,1,2} = \mu_0/(1+\mu_{FD,1,1})$$

If C1 is not met, then as mentioned above C1' is not met; therefore:

$$\mu_{FD,1,1} > \mu_{HD,1,U}/(1-\mu_{HD,1,U})$$

and thus:

$$\mu_{FD,1,2} < \mu_{HD,1,2}$$

Inequality (2) remains valid if, letting:

$$\varepsilon = 1/\log(1+\mu_{FD,1,2}) - 1/\log(1+\mu_{HD,1,2})$$

with $\varepsilon > 0$, it is ensured that the following condition C2 is met:

$$(W1/W2) \cdot \log(1+\mu_{HD,BS,1}) < 1/\varepsilon$$

Lastly, inequality (2) may also be written in the form:

$$1/\log(1+\mu_0/(1+\mu_{FD,1,1})) < 1/\log(1+\mu_0(1+\mu_{HD,1,U})) + W2/[W1 \cdot \log(1+\mu_{HD,BS,1})]$$

Letting:

$$B = 1/\log(1+\mu_0(1-\mu_{HD,1,U}))$$

and $$C = W2/[W1 \cdot \log(1+\mu_{HD,BS,1})]$$

inequality (2) may be written:

$$1/\log(1+\mu_0/(1+\mu_{FD,1,1})) < B+C.$$

It therefore follows that inequality (2) is respected if the following condition C3 is met:

$$\mu_{FD,1,1} < \mu_0/[\exp(1/(B+C))-1]-1$$

It will be noted that the quantities (SINR, powers, interference, etc.) present under conditions C1 to C3 may vary with time, and in particular with the speed of the user equipments in question (vehicles V1 and V2 and/or user equipment U). For the sake of simplification of the notations, the dependency on time has been omitted from the formulae given here.

We will now describe how these conditions C1 to C3 are considered by the controller CTRL, in one particular embodiment. FIG. 4 shows the main steps of the controlling method implemented by the controller CTRL in this particular embodiment to decide which data-transmission mode the vehicle V1 must use to receive data D2 from the vehicle V2 and to send data D1 to the base station BS (or vice versa).

It is assumed here that the vehicles V1 and V2 are paired beforehand in order to be able to set up a peer-to-peer communication. No limitation is placed on the wireless communication interface used by the vehicles V1 and V2 to set up this communication: it may for example be a communication interface using an OFDMA (for Orthogonal Frequency-Division Multiple Access) transmission system such as an LTE (Long-Term Evolution) communication interface.

Such pairing between the vehicles V1 and V2 may be carried out for example as described in the document by J. M. Kelif et al. entitled "Meeting Energy-Efficient and QOS Requirements of 5G using D2D communications", 18 Dec. 2017 (https://arxiv.org/abs/1712.06461). The vehicle V1 is moreover connected to the base station BS of the network NW. It is assumed that the vehicle V1 is then configured to communicate with the vehicle V2 and with the base station in half-duplex mode.

Following this pairing, the vehicle V1 carries out various measurements, in a way known per se, for example by exploiting predefined control signals sent via the network NW by the other user equipments connected to the network NW, and especially to the base station BS, and by the vehicle V2.

It especially measures the power $P_2^{(1)}$ received from the vehicle V2, but also the power received from other "interfering" communication devices simultaneously using the same radio resource as the vehicle V2 (namely here the frequency f0) to communicate with the vehicle V1. It may for example be a question of other vehicles communicating peer-to-peer and using the frequency f0 simultaneously to the vehicles V1 and V2. This power is the overall interference $I_G$ experienced by the vehicle V1 in half-duplex transmission mode. It in particular comprises the interference $I_{1,U}$ generated by the user equipment U during its communications with the base station BS and the interference $I_{oth}$ generated by all the communication devices other than the user equipment U (fourth communication device(s) as meant in the context of the disclosed technology). It will be noted that the same interference $I_{oth}$ affects the vehicle V1 when the latter communicates in full-duplex mode (with which is then combined the self-interference $I_{1,1}$ generated by the vehicle V1 itself).

It will also be noted that the measurements carried out by the vehicle V1 may be carried out at various times, for example periodically or on detection of particular events, so as to continuously or quasi-continuously evaluate the conditions under which the vehicle V1 is operating and to be able to re-evaluate at various times the relevance of switching or not to a full-duplex transmission mode.

The vehicle V1 moreover estimates the self-interference level $I_{1,1}$ that it generates when operating in full-duplex transmission mode. As indicated above, this self-interference level corresponds to the residual interference level after the vehicle V1 has cancelled out interference affecting the data transmitted by the vehicle V2. It is for example described in the document T. Huusari et al. entitled "Wideband Self-Adaptive RF Cancellation Circuit for Full-Duplex Radio: Operating Principle and Measurements", IEEE Vehicular Technology Conference, March 2015. This self-interference level $I_{1,1}$ may be expressed equivalently in the form of the product of a so-called self-interference factor β of the vehicle V1 multiplied by the emission power $P_1$ used by the vehicle V1 to send data to the base station BS, i.e. $I_{1,1} = \beta \cdot P_1$. This self-interference factor β is a fixed parameter, which may be evaluated by or for the vehicle V1 beforehand.

The various measurements and estimations carried out by the vehicle V1 are transmitted by the latter to the controller CTRL (step E10), via its communication interface over the network NW. It will be noted that the vehicle V1 may either transmit to the controller CTRL an estimation of its self-interference level $I_{1,1}$ or the individual parameters β and $P_1$.

In the embodiment described here, on the basis of the measurements and estimations received from the vehicle V1, the controller CTRL, via its determining module 7, determines whether the condition C1 is met (testing step E20), i.e. whether:

$$I_{1,1} < I_{1,U}$$

where $I_{1,U}$ is the interference level generated at the vehicle V1, when the latter operates in half-duplex mode and receives data from the vehicle V2 over the radio resource f0, by another user equipment connected to the network NW and simultaneously communicating over the resource f0 with the base station BS, namely here the user equipment U.

To estimate the interference $I_{1,U}$, the controller CTRL uses, in the described embodiment, the following approximation:

$$I_{1,U} = K \cdot P_u \cdot (DIST_{1,U})^{-n}$$

where K designates a propagation factor, $P_u$ the emission power used by the user equipment U to send data to the base station BS, $DIST_{1,U}$ the distance separating the vehicle V1 from the user equipment U (at the time in question) and n designates a pathloss exponent. This approximation models the propagation of waves through free space and is known to those skilled in the art.

It will be noted that the distance $DIST_{1,U}$ may be estimated by the controller CTRL from the positions of the user equipment U and of the vehicle V1, these positions being able to be determined by the user equipment U (with its emission power $P_u$) and by the vehicle V1. Specifically, the latter may be equipped with GPS receivers that allow them to determine their respective positions and to transmit these positions to the controller CTRL via the network NW.

As a variant, the position of the user equipment U may be communicated to the controller CTRL by the base station BS at the same time as the emission power $P_u$. The same goes for the position of the vehicle V1.

Thus, the determining module 7 of the controller CTRL here determines that the condition C1 is met if it determines that:

$$DIST_{1,U} < [K \cdot P_u / I_{1,1}]^{1/n}$$

If the condition C1 is met (response yes to step E20), the activating module 8 of the controller CTRL activates the full-duplex transmission mode in the vehicle V1 (step E30). To this end, it sends a message to the vehicle V1, for example via the network NW. Following this activation, the vehicle V1 may receive the data D2 from the vehicle V2 at the same time and over the same radio resource (same frequency f0 for example) that it uses to send its data D1 to the base station BS.

If the condition C1 is not met (response no to step E20), in the embodiment described here, the controller CTRL, via its determining module 7, test the condition C3 (testing step E40), i.e. tests whether:

$$\mu_{FD,1,1} < \mu_0 / [\exp(1/(B+C)) - 1] - 1$$

with:

$$\mu_{FD,1,1} = I_{1,1} / (I_{oth} + N_{th})$$

$$B = 1/\log(1 + \mu_0(1 - \mu_{HD,1,U}))$$

$$C = W2 / [W1 \cdot \log(1 + \mu_{HD,BS,1})]$$

$$\mu_0 = P_2^{(1)} / (I_{oth} + N_{th})$$

$$\mu_{HD,1,U} = I_{1,U} / (I_{1,U} + I_{oth} + N_{th})$$

To evaluate the factors B and C and the ratio $\mu_0$, the controller CTRL uses the measurements and the estimations communicated by the vehicle V1. Furthermore, if it has not estimated the interference level $I_{1,U}$ directly during step E20, it has available to it all the information necessary to do so. From the estimation of the interference level $I_{1,U}$ and of the overall interference level $I_G = I_{1,U} + I_{oth} + N_{th}$, which estimation is delivered by the vehicle V1, it may then deduce the ratio $\mu_0$. The controller CTRL may also estimate the SINR $\mu_{HD,BS,1}$ from the power $P_1^{(BS)}$, which may be communicated by the base station BS.

If the controller CTRL determines that the condition C3 is met (response yes to step E40), the activating module 8 of the controller CTRL activates the full-duplex transmission mode in the vehicle V1, as described above (step E30).

If the controller CTRL determines that the condition C3 is not met (response no to step E40), in the embodiment described here, the controller CTRL, via its determining module 7, tests the condition C2 (i.e. verifies whether it is met) (testing step E50), i.e. whether:

$$(W1/W2) \cdot \log(1 + \mu_{HD,BS,1}) < 1/\varepsilon \text{ with } \varepsilon = 1/\log(1 + \mu_{FD,1,2}) - 1/\log(1 + \mu_{HD,1,2})$$

To evaluate the SINRs $\mu_{HD,BS,1}$, $\mu_{FD,1,2}$ and $\mu_{HD,1,2}$, the controller CTRL uses the measurements and the estimations communicated by the vehicle V1. Furthermore, it may use the following relationships, which were introduced above:

$$\mu_{HD,BS,1} = P_1^{(BS)} / (I_{oth} + N_{th})$$

$$\mu_{HD,1,2} = \mu_0(1 - \mu_{HD,1,U}) \text{ and } \mu_{FD,1,2} = \mu_0 / (1 + \mu_{FD,1,1})$$

and where appropriate employ quantities that it has already estimated in steps E20 and E40.

If the condition C2 is met (response yes to step E50), the activating module 8 of the controller CTRL activates the full-duplex transmission mode at the vehicle V1, as described above (step E30).

Otherwise, the controller CTRL does not modify the configuration of the vehicle V1 and lets it use the half-duplex mode to receive the data D2 from the vehicle V2 and to send the data D1 to the base station BS (step E60).

Steps E10 to E60 are preferably reiterated at various times in order to determine whether a change in the configuration of the vehicle V1 must be envisioned. It will be noted that to estimate the various quantities featuring in the conditions C1 to C3, the controller CTRL may either use measurements communicated at various times by the vehicle V1, or deduce from measurements communicated at a time t0 the value of certain of these quantities at any time t given the speed of movement of the vehicle V1. This is for example the case of the SINR which may be estimated at a time t in the following way:

$$\mu_{HD,1,U}(t) = \mu_{HD,1,U}(t0) + (t-t0) \cdot v_1 [d\mu_{HD,1,U}(t)/dDIST_{1,U}]$$

where $v_1$ designates the speed of the vehicle V1. It will be noted that a similar approach may be adopted to estimate, generally, any SINR and/or interference that varies as a function of time and more particularly of the position of the vehicles V1 and/or V2.

In the embodiment described here, the controller CTRL successively tests the conditions C1, C3 and C2. It is possible to envision testing only some of the conditions C1 to C3 and/or in a different order.

Thus, by way of example, only the condition C1 or only the condition C2 may be tested.

According to another example, the condition C1 may be tested followed by the condition C3 if the condition C1 is not met.

Other testing configurations may be envisioned, and other conditions, in particular in addition to the conditions C1 and C2.

As mentioned above, the conditions C1 to C3 were derived by the inventors based on the assumption that the peer-to-peer communication data rate $R_{FD}(D2)$ is lower than (or equal to) the communication data rate $R_{FD}(D1)$ over the network NW, this assumption being in practice most often correct. It will further be noted that although the conditions C1 to C3 were derived assuming that VOL1≥VOL2, it may easily be demonstrated that they are still valid in the case $R_{FD}(D2) < R_{FD}(D1)$ for VOL2>VOL1.

In another embodiment, it is possible to envision that the controlling method comprises verifying, as described above, all or some of the conditions C1 to C3 when the controller CTRL determines or is informed that the data rate $R_{FD}(D2)$ is lower than the data rate $R_{FD}(D1)$, and verifying one or more alternative conditions, such as the conditions C4 or C5 described below, when the data rate $R_{FD}(D2)$ is higher than the data rate $R_{FD}(D1)$. When the data rate $R_{FD}(D2)$ is equal to the data rate $R_{FD}(D1)$, the controller CTRL may test either the conditions C1 to C3, or either of the conditions C4 and C5.

In the preferred case of application in which the data D1 comprise the data D2 and optionally other additional data (i.e. VOL1≥VOL2), inequality (1) becomes:

$$VOL2/R_{FD}(D1) + (VOL1-VOL2)/R_{FD}(D1) < VOL2/R_{HD}(D2) + VOL1/R_{HD}(D1)$$

namely $$VOL1/R_{FD}(D1) < VOL2/R_{HD}(D2) + VOL1/R_{HD}(D1)$$

which may also be written, inserting into the above inequality the expressions for $R_{FD}(D1)$, $R_{HD}(D2)$ and $R_{HD}(D1)$:

$$1/\log(1+\mu_{FD,BS,1}) < \alpha/\log(1+\mu_{HD,1,2}) + 1/\log(1+\mu_{HD,BS,1})$$

with $\alpha = (VOL2/VOL1) \cdot (W1/W2)$ and where $\mu_{FD,BS,1}$ designates the SINR received by the base station BS when the vehicle V1, in full-duplex mode, sends the data D1 to the base station BS while receiving the data D2 over the same radio resource simultaneously from the vehicle V2. It will be noted that $\alpha=1$ in the preferred case of application in which the data D1 correspond to the data D2 (and therefore VOL2=VOL1) and W1=W2.

The SINR $\mu_{FD,BS,1}$ is approximated by:

$$\mu_{FD,BS,1} = P_1^{(BS)}/(I_{oth}+N_{th}+I_{2,BS})$$

where $P_1^{(BS)}$ designates the power received at the base station BS of the data D1 transmitted by the vehicle V1 in full-duplex mode, and $I_{2,BS}$ the level of the interference generated at the base station BS by the simultaneous transmission of the data D2 by the vehicle V2 to the vehicle V1 operating in full-duplex mode. It will be noted that $\mu_{FD,BS,1}$ is always less than $\mu_{HD,BS,1}$.

Letting:

$$A = \alpha/\log(1+\mu_{HD,1,2}) + 1/\log(1+\mu_{HD,BS,1})$$

the following condition is obtained:

$$1/\log(1+\mu_{FD,BS,1}) < A$$

which is equivalent to the following condition C4:

$$\mu_{FD,BS,1} > \exp(1/A) - 1$$

The information required to evaluate the conditions C4 may be obtained by the controller from the base station BS, which is able to measure the received power and interference levels using control signals emitted by the vehicle V1 and/or by the vehicle V2.

It will be noted that a condition C5 may also be envisioned when VOL2>VOL1.

A transmission time in full-duplex mode shorter than the transmission time in half-duplex mode may be expressed by:

$$VOL2/R_{FD}(D2) < VOL2/R_{HD}(D2) + VOL1/R_{HD}(D1)$$

or by the following condition C5 obtained by inserting into the above inequality the expressions for $R_{FD}(D2)$, $R_{HD}(D2)$ and $R_{HD}(D1)$:

$$1/[W2 \cdot \log(1+\mu_{FD,1,2})] < 1/[W2 \cdot \log(1+\mu_{HD,1,2})] + (VOL1 \cdot W2)/[VOL2 \cdot W1 \cdot \log(1+\mu_{HD,BS,1})]$$

The disclosed technology thus advantageously makes it possible to benefit from the advantages of the full-duplex transmission mode, with a view to allowing a vehicle V2 to send data to a base station BS via another vehicle V1 without however sacrificing the quality of the transmissions. It has a preferred but nonlimiting application in the context of 4G networks and 5G networks, which enable a wide variety of user equipments, such as vehicles, to be connected and to benefit from high data rates.

What is claimed is:

1. A method for controlling a data-transmission mode intended to be used by a first vehicle to communicate with a second vehicle and with a base station of a wireless communication network, the method performed by a controller and comprising:

determining whether a condition is met, the condition being:

$$I_{1,1} < I_{1,U} \quad \text{a condition C1:}$$

$$(W1/W2) \cdot \log(1+\mu_{HD,BS,1}) < 1/\varepsilon \quad \text{or a condition C2:}$$

with $\varepsilon = 1/\log(1+\mu_{FD,1,2}) - 1/\log(1+\mu_{HD,1,2})$, where:

W1 and W2 designate the bandwidths of the transmission channels between the first vehicle and the base station, and between the second vehicle and the first vehicle, respectively;

$I_{1,1}$ is a self-interference level reached at the first vehicle when it operates in full-duplex mode and sends data to the base station via a radio resource over which it simultaneously receives data from the second vehicle;

$I_{1,U}$ is an interference level generated at the first vehicle by a third communication device, when the third communication device sends data to the base station via a radio resource over which the first vehicle simultaneously, in half-duplex mode, receives data from the second vehicle;

$\mu_{ED,BS,1}$ is a signal-to-interference-plus-noise ratio (SINR) received by the base station when the first vehicle, in half-duplex mode, sends data to the base station;

$\mu_{FD,1,2}$ is an SINR received at the first vehicle when the first vehicle, in full-duplex mode, receives data from the second vehicle via a radio resource over which the first vehicle simultaneously sends data to the base station; and $\mu_{HD,1,2}$ is an SINR received at the first vehicle when the first vehicle, in half-duplex mode, receives data from the second vehicle; and upon determining that the condition is met, activating a full-duplex data-transmission mode at the first vehicle in order to communicate with the second vehicle.

2. The method of claim 1, wherein determining whether the condition is met comprises determining whether the condition C1 is met and comprises comparing:

a distance between the first vehicle and the third communication device; with a ratio, raised to the power of n, where n designates the inverse of a pathloss exponent:
of a product of a propagation factor multiplied by an emission power of the third communication device when the third communication device sends data to the base station via a radio resource over which the first vehicle, in half-duplex mode, simultaneously receives data from the second vehicle, and
of the self-interference level $I_{1,1}$;
the condition C1 being met if the distance is lower than the ratio.

3. The control method of claim 2, further comprising:
receiving, from the first vehicle, the self-interference level $I_{1,1}$ or a self-interference factor of the first vehicle and an emission power of the first vehicle; and/or
receiving, from the third communication device or the base station, the emission power of the third communication device.

4. The method of claim 2, wherein the distance between the first vehicle and the third communication device is determined from a position of the first vehicle, which position is measured by the first vehicle, and/or a position of the third communication device, which position is measured by the third communication device.

5. The method of claim 1, wherein determining whether a condition is met comprises determining whether the condition C1 is met, and if the condition C1 is not met, the method furthermore comprises:
determining whether the condition C2 is met; and
activating the full-duplex data-transmission mode at the first vehicle if the condition C2 is met.

6. The method of claim 1, wherein determining whether a condition is met comprises determining whether the condition C1 is met, and if the condition C1 is not met, the method further comprises:
determining whether a condition C3:

$$\mu_{FD,1,1} < \mu_0/[\exp(1/(B+C))-1]-1$$

is met with:

$$\mu_{FD,1,1} = I_{1,1}/(I_{oth}+N_{th})$$

$$B = 1/\log(1+\mu_0(1-\mu_{HD,1,U}))$$

$$C = W2/[W1 \cdot \log(1-\mu_{HD,BS,1})]$$

$$\mu_0 = P_2^{(1)}/(I_{oth}+N_{th})$$

$$\mu_{HD,1,U} = I_{1,U}/(I_{1,U}+I_{oth}+N_{th})$$

where
$P_2^{(1)}$ is a power of the data received by the first vehicle from the second vehicle;
$I_{oth}$ is an interference level generated at the first vehicle by at least one fourth communication device sending data via a radio resource over which the first vehicle, in full-duplex mode, simultaneously sends data to the base station and receives data from the second vehicle or over which the first vehicle, in half-duplex mode, simultaneously receives data from the second vehicle; and
$N_{th}$ is a noise level received by the first vehicle; and
activating the full-duplex data-transmission mode at the first vehicle if the condition C3 is met.

7. The method of claim 6, further comprising, if the condition C3 is not met:
determining whether condition C2 is met; and
activating the full-duplex data-transmission mode at the first vehicle if the condition C2 is met.

8. The method of claim 1, wherein the step of determining if the condition C1 is met and, where appropriate, the step of determining if the condition C2 is met, is reproduced at various times.

9. The method of claim 1, wherein the step of determining if the condition C1 is met and, where appropriate, the step of determining if the condition C2 is met, is carried out if a data-transmission rate between the second vehicle and the first vehicle is lower than or equal to a data-transmission rate between the first vehicle and the base station.

10. The method of claim 9, further comprising, when the data-transmission rate between the second vehicle and the first vehicle is higher than the data-transmission rate between the first vehicle and the base station:
determining whether a condition is met, the condition being chosen among:

$$\mu_{FD,BS,1} > \exp(1/A)-1 \quad \text{a condition C4:}$$

with $A = \alpha/\log(1-\mu_{HD,1,2})+1/\log(1+\mu_{HD,BS,1})$ and $\alpha = (VOL2/VOL1) \cdot (W1/W2)$, where $\mu_{FD,BS,1}$ designates the SINR received by the base station when the first vehicle, in full-duplex mode, sends a volume VOL1 of data to the base station BS and simultaneously receives over the same radio resource a volume VOL2 of data from the second vehicle, and $$1/[W2 \cdot \log(1+\mu_{FD,1,2})] < 1/[W2 \cdot \log(1-\mu_{HD,1,2})] + (VOL1 \cdot W2)/[VOL2 \cdot W1 \cdot \log(1+\mu_{HD,BS,1})]; \text{ and} \quad \text{a condition C5:}$$

activating the full-duplex data-transmission mode at the first vehicle if the condition chosen among the condition C4 and the condition C5 is met.

11. A computer comprising a processor and a memory, the memory having stored thereon instructions which, when executed by the processor, cause the processor to implement the method of claim 1.

12. A non-transitory computer-readable storage medium having stored thereon instructions which, when executed by a processor, cause the processor to implement the method of claim 1.

13. A controller configured to control a data-transmission mode used by a first vehicle to communicate with a second vehicle and with a base station of a wireless communication network, the controller comprising a processor, the controller configured to:

determine whether a condition is met, the condition being:

$I_{1,1} < I_{1,U}$      a condition C1:

$(W1/W2) \cdot \log(1+\mu_{HD,BS,1}) < 1/\varepsilon$      or a condition C2:

with $\varepsilon = 1/\log(1+\mu_{FD,1,2}) - 1/\log(1+\mu_{HD,1,2})$, where:

W1 and W2 designate the bandwidths of the transmission channels between the first vehicle and the base station, and between the second vehicle and the first vehicle, respectively;

$I_{1,1}$ is a self-interference level reached at the first vehicle when it operates in full-duplex mode and sends data to the base station via a radio resource over which it simultaneously receives data from the second vehicle;

$I_{1,U}$ is an interference level generated at the first vehicle by a third communication device, when the third communication device sends data to the base station via a radio resource over which the first vehicle simultaneously, in half-duplex mode, receives data from the second vehicle;

$\mu_{ED,BS,1}$ is a signal-to-interference-plus-noise ratio (SINR) received by the base station when the first vehicle, in half-duplex mode, sends data to the base station;

$\mu_{FD,1,2}$ is an SINR received at the first vehicle when the first vehicle, in full-duplex mode, receives data originating from the second vehicle via a radio resource over which the first vehicle simultaneously sends data to the base station; and $\mu_{HD,1,2}$ is an SINR received at the first vehicle when the first vehicle, in half-duplex mode, receives data from the second vehicle; and activate a full-duplex data-transmission mode at the first vehicle in order to communicate with the second vehicle and with the base station if the condition is met.

14. A transmission system, comprising:

a first vehicle;

a second vehicle, the first vehicle and the second vehicle capable of communicating with one another via peer-to-peer communication;

a base station of a wireless communication network, the first vehicle and the second vehicle capable of communicating with the base station; and the roller of claim 13, the controller configured to control a data-transmission mode used by the first vehicle to communicate with the second vehicle and with the base station.

15. The transmission system of claim 14, wherein the controller is located in a base station or in a centralized management entity of the wireless communication network.

* * * * *